(12) United States Patent
Matsuura

(10) Patent No.: US 7,766,994 B2
(45) Date of Patent: Aug. 3, 2010

(54) ULTRASONIC SOLUTION SEPARATING METHOD AND ULTRASONIC SEPARATING APPARATUS USED IN THIS METHOD

(75) Inventor: Kazuo Matsuura, Naruto (JP)

(73) Assignee: Ultrasound Brewery, Naruto-shi (JP)

( * ) Notice: Subject to any disclaimer, the term of this patent is extended or adjusted under 35 U.S.C. 154(b) by 454 days.

(21) Appl. No.: 11/794,377

(22) PCT Filed: Dec. 29, 2005

(86) PCT No.: PCT/JP2005/024149
§ 371 (c)(1),
(2), (4) Date: Jun. 28, 2007

(87) PCT Pub. No.: WO2006/070894
PCT Pub. Date: Jul. 6, 2006

(65) Prior Publication Data
US 2007/0295595 A1    Dec. 27, 2007

(30) Foreign Application Priority Data
Dec. 29, 2004  (JP) ................. 2004-383004

(51) Int. Cl.
*B01D 51/08*  (2006.01)
(52) U.S. Cl. ................. 95/29; 96/389; 261/78.1; 261/78.2
(58) Field of Classification Search ............. 95/29, 95/30; 96/389; 204/158.2; 210/149, 188; 261/78.2
See application file for complete search history.

(56) References Cited
U.S. PATENT DOCUMENTS

| | | | |
|---|---|---|---|
| 3,392,916 A * | 7/1968 | Engstrom et al. ........ | 239/102.2 |
| 4,599,459 A * | 7/1986 | Hirose ................. | 568/471 |
| 4,722,901 A * | 2/1988 | Hirose ................. | 435/300.1 |
| 4,860,547 A * | 8/1989 | Maldague ............... | 62/86 |
| 6,235,088 B1 | 5/2001 | Matsuura | |
| 7,347,889 B2 * | 3/2008 | Matsuura et al. ........ | 96/389 |
| 2005/0016380 A1 | 1/2005 | Matsuura et al. | |

FOREIGN PATENT DOCUMENTS

| | | |
|---|---|---|
| JP | 3-244375 A | 10/1991 |
| JP | 10-202038 A | 8/1998 |
| JP | 10-295358 A | 11/1998 |
| JP | 2001-314724 A | 11/2001 |
| JP | 2005-66553 A | 3/2005 |

* cited by examiner

*Primary Examiner*—Duane Smith
*Assistant Examiner*—Sonji Turner
(74) *Attorney, Agent, or Firm*—Birch, Stewart, Kolasch, Birch, LLP

(57) ABSTRACT

An ultrasonic solution separating method wherein a solution is ultrasonically vibrated and atomized into mist in a carrier gas in an ultrasonic atomizing chamber (4) and the carrier gas including atomized mist is transferred to a collecting part (5) and in the collecting part (5) the mist component comprising solution atomized into mist is separated from the carrier gas. In the ultrasonic solution separating method, in the collecting part (5), mist component is separated from the carrier gas in an adsorbing step of causing mist component to be adsorbed onto an adsorbing agent (15) by bringing the carrier gas including mist component into contact with the adsorbing agent (15) and a separating step of separating mist component adsorbed onto the adsorbing agent (15) in the adsorbing step from the adsorbing agent (15), and mist component is separated from the carrier gas with the pressure of the separating step being made lower than the pressure of adsorbing step.

13 Claims, 9 Drawing Sheets

ULTRASONIC SOLUTION SEPARATING METHOD AND ULTRASONIC SEPARATING APPARATUS USED IN THIS METHOD

TECHNICAL FIELD

This invention relates to a method and apparatus for separating out a high-concentration solution with a high concentration of a target substance from a mixture including two or more substances, or separating out a target substance included in a solution, and particularly to a method and apparatus ideal for separating alcohol of a higher concentration from an alcohol solution such as sake or a sake raw material, or for separating a high-concentration solution of a target substance from gasoline.

BACKGROUND ART

The present inventors developed an apparatus for separating high-concentration alcohol from alcohol (See JP-A-2001-314724).

In this separating apparatus, an ultrasonic atomizing chamber of a closed construction is filled will an alcohol solution, the alcohol solution in this ultrasonic atomizing chamber is ultrasonically vibrated with ultrasonic vibrators and thereby atomized into a mist, and the atomized mist is condensed and collected, whereby a high-concentration alcohol solution is separated out. The mechanism by which this separating apparatus is able to separate out high-concentration alcohol as a target substance is as follows.

Alcohol has a greater tendency than water to migrate to the surface of a solution, and the concentration of alcohol in the solution at the surface is high. When in this state the solution is ultrasonically vibrated, high-concentration alcohol turns into mist in the air under the energy of the ultrasonic vibration and is released in fine particles. The mist released into the air has a high concentration of alcohol. This is because the solution at the surface, where the alcohol concentration is high, readily turns into mist. Consequently, when the mist is condensed and collected, a high-concentration alcohol solution is obtained. With this method it is possible to separate out a high-concentration alcohol solution without heating the solution. Because of this, it is possible to separate a target substance to a high concentration with a low energy consumption. And, because there is no heating, there is also the advantage that the target substance can be separated without it being decomposed.

DISCLOSURE OF INVENTION

Problem to be Solved by the Invention

Figure 1:
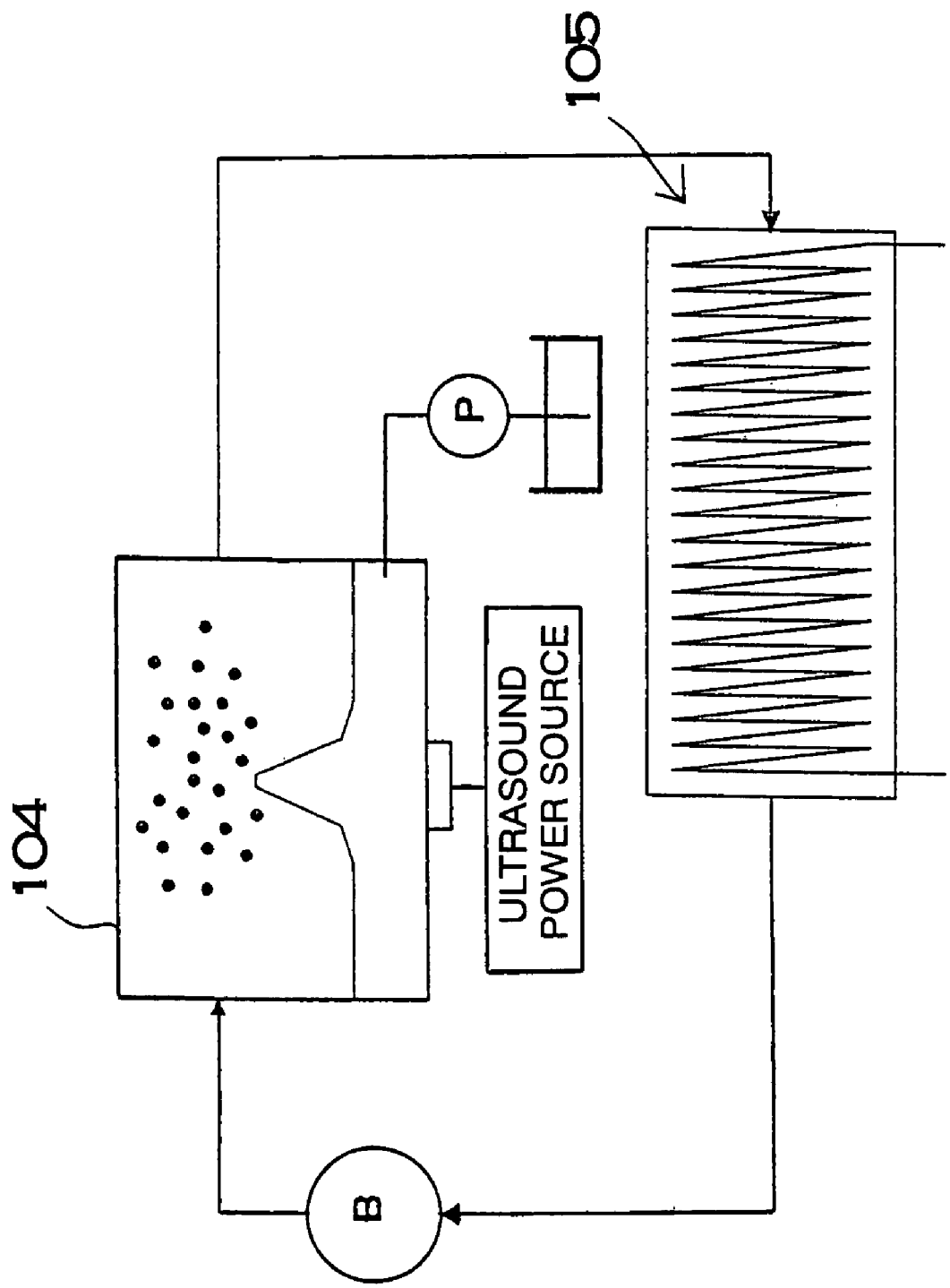

FIG. 1 is a block diagram of an apparatus for ultrasonically vibrating a solution into mist and agglomerating and collecting this in a collecting part.

The ultrasonic separating apparatus in this figure agglomerates and collects mist created in an ultrasonic atomizing chamber 104 in a collecting part 105. When this apparatus is used to separate high-concentration alcohol, the alcohol concentration of the mist varies. The alcohol concentration of the mist is high immediately after the mist is created in the ultrasonic atomizing chamber 104 and then gradually falls as it is transferred to the collecting part 105. This is because as it is transferred from the ultrasonic atomizing chamber 104 to the collecting part 105, the alcohol contained in the mist evaporates into a vapor. Both alcohol and water evaporate into vapor from the mist. However, alcohol has a greater tendency than water to vaporize. Consequently, when the mist evaporates, more alcohol than water evaporates, and the alcohol concentration of the mist falls. Therefore, the mist created in the ultrasonic atomizing chamber 104 gradually loses alcohol concentration as it is transferred to the collecting part 105.

Figure 2:
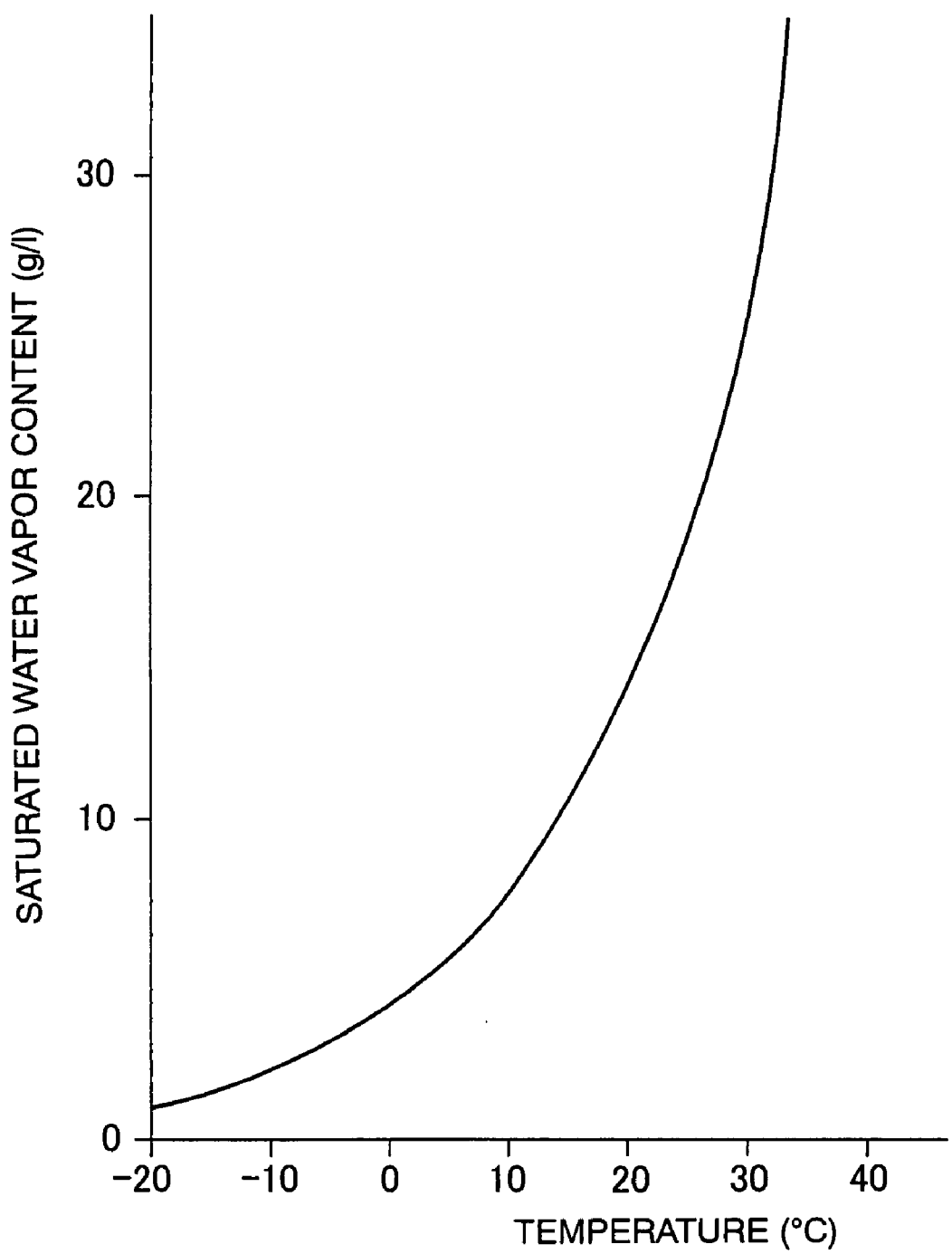

Because the alcohol in the transferred mist evaporates and forms a vapor, the alcohol supplied to the collecting part 105 assumes the state of a mist of fine droplets and the state of an evaporated vapor. The alcohol supplied in the state of a mist agglomerates and is collected in the collecting part 105, and the vapor alcohol is collected by the carrier gas being cooled and condensed. Although the alcohol vapor can be condensed and collected, the amount of alcohol that can be condensed and collected is limited. This is because the cooled carrier gas can contain some alcohol and water in a gaseous state. FIG. 2 is a saturated water vapor level curve showing how much water air can contain in a vapor state. In other words, it is a graph showing the relationship between the total amount of water contained in air and temperature in the saturated state, which is when the humidity is 100%. Although this figure shows amount of water included in air, the amount of water and alcohol that air can contain in total varies with temperature as shown in this figure, and as the temperature rises the amount increases and as the temperature falls the amount decreases.

As is clear from this figure, because the amount of water that the air used as the carrier gas can contain becomes small as the temperature decreases, when the air is cooled, supersaturated water and alcohol condense out of the air into liquid. However, because, as is clear from this graph, even when the air temperature is 0° C. some water can be contained in the vapor state, it is not possible to condense and collect all of the alcohol.

A particular problem is that when alcohol and water evaporated from mist and contained in the carrier gas are condensed and collected, the water condenses and is collected more easily than the alcohol. That is, alcohol evaporates more readily from mist, and after evaporation water condenses more readily than alcohol. Consequently, the alcohol concentration contained in the carrier gas becomes even higher after the carrier gas is cooled and alcohol and water are recovered from it. This is because alcohol evaporates readily and does not condense readily. For example, the mol concentration of alcohol of the mist created in the ultrasonic atomizing chamber is 30 mol and the alcohol concentration of the mist supplied to the collecting part is lower at 25 mol, but the mol concentration of the alcohol vapor contained in the carrier gas is 50 mol in the state in which it is supplied to the collecting part and is extremely high, at 70 mol, in the state in which it is removed from the collecting part. From this it can be seen that while high-concentration alcohol is turned to mist in the ultrasonic atomizing chamber, this is not being effectively recovered. This undesirable effect can be resolved for example by lowering the temperature to which the carrier gas is cooled to condense and collect alcohol and water more effectively. However, when the temperature of the carrier gas is lowered, the energy consumed in cooling it becomes large and running costs become high. Also, because when low-temperature carrier gas is supplied to the ultrasonic atomizing chamber the efficiency with which the solution is turned to mist falls markedly, it is necessary for the low-temperature carrier gas to be heated before it is supplied to the ultrasonic atomizing chamber. And there is also the shortcoming that the lower the temperature of the carrier gas is at this time, the more energy is required to heat it.

Accordingly, in an ultrasonic separating apparatus of related art, there has been the shortcoming that while a mist with a high alcohol concentration is created in the ultrasonic atomizing chamber, it is difficult to recover this efficiently and effectively. This invention was developed with the object of resolving this shortcoming, and a first important object of the invention is to provide an ultrasonic solution separating method and apparatus with which it is possible efficiently to recover a target substance contained in a mist created from a solution. And, a second object of the invention is to provide an ultrasonic solution separating method and apparatus with which it is possible efficiently to adsorb onto an adsorbing agent and collect a mist component contained in a mist.

In an ultrasonic solution separating method according to the invention, in an ultrasonic atomizing chamber 4 a solution is ultrasonically vibrated and atomized into mist in a carrier gas, the carrier gas including the atomized mist is transferred to a collecting part 5, and in the collecting part 5 a mist component comprising mist atomized from the solution is separated from the carrier gas and collected. In the ultrasonic solution separating method, in the collecting part 5, mist component is separated from the carrier gas in an adsorbing step of causing mist component to be adsorbed onto an adsorbing agent 15 by bringing the carrier gas including mist component into contact with the adsorbing agent 15 and a separating step of separating mist component adsorbed onto the adsorbing agent 15 in the adsorbing step from the adsorbing agent 15, and mist component is separated from the carrier gas with the pressure of the separating step being made lower than the pressure of the adsorbing step.

In an ultrasonic solution separating method according to the invention, in the collecting part 5, after the carrier gas is cooled and mist component is separated from it in a cooler 12, the carrier gas may be brought into contact with an adsorbing agent 15 to cause mist component to be adsorbed onto the adsorbing agent 15.

In an ultrasonic solution separating method according to the invention, in the separating step, the adsorbing agent 15 can be disposed in a closed chamber 16 and mist component can be separated from the adsorbing agent 15 by the carrier gas in this closed chamber 16 being removed with a vacuum pump 17 and the closed chamber 16 thereby being brought to a pressure lower than atmospheric pressure.

In an ultrasonic solution separating method according to the invention, in the adsorbing step, mist component can be caused to be adsorbed onto the adsorbing agent 15 with the adsorbing agent 15 disposed in a closed chamber 16 at atmospheric pressure.

Also, in an ultrasonic solution separating method according to the invention, in the adsorbing step, mist component can be caused to be adsorbed onto the adsorbing agent with the adsorbing agent 15 disposed in a closed chamber 16 pressurized to a pressure higher than atmospheric pressure.

In an ultrasonic solution separating method according to the invention, the temperature of the adsorbing agent 15 in the adsorbing step can be made lower than the temperature of the adsorbing agent 15 in the separating step.

An ultrasonic separating apparatus according to the invention has an ultrasonic atomizing chamber 4 to which a solution is supplied, ultrasonic vibrators 2 for ultrasonically vibrating and atomizing into mist and dispersing the solution in this ultrasonic atomizing chamber 4, ultrasound power sources 3 connected to the ultrasonic vibrators 2 for causing the ultrasonic vibrators 2 to vibrate ultrasonically by supplying high-frequency electrical power to them, and a collecting part 5 for separating a mist component atomized by the ultrasonic vibrators 2 and transferred with a carrier gas from the carrier gas by adsorbing it onto an adsorbing agent 15. The collecting part 5 has an adsorption collecting part 9 for separating the mist component from the carrier gas by adsorbing mist component included in the carrier gas onto the adsorbing agent 15 by bringing the carrier gas into contact with the adsorbing agent 15 and then separating the adsorbed mist component from the adsorbing agent 15. This adsorption collecting part 9 separates mist component from the carrier gas by making the pressure at which it separates the mist component from the adsorbing agent 15 is lower than the pressure at which it brings the carrier gas into contact with the adsorbing agent 15 to cause it to be adsorbed.

In the ultrasonic separating apparatus of the invention, the collecting part 5 has a first-stage collecting part 8 for recovering mist component by cooling the carrier gas and an adsorption collecting part 9 to which carrier gas from which mist component has been separated in the first-stage collecting part 8 is supplied.

In the ultrasonic separating apparatus of the invention, in the adsorption collecting part 9, a closed chamber 16 can be filled with an adsorbing agent 15 and a vacuum pump 17 connected to this closed chamber 16 and the vacuum pump 17 can remove gas from the closed chamber 16 to separated mist component from the adsorbing agent 15.

In the ultrasonic separating apparatus of the invention, the closed chamber 16 can be connected to the ultrasonic atomizing chamber 4 by way of an opening/closing valve 18 and the opening/closing valve 18 can be opened to supply carrier gas including mist component from the ultrasonic atomizing chamber 4 into the closed chamber 16 to adsorb mist component onto the adsorbing agent 15, and the opening/closing valve 18 can be closed to reduce the pressure in the closed chamber 16 and separate mist component from the adsorbing agent 15.

In the ultrasonic separating apparatus of the invention, a pair of closed chambers 16 can be filled with adsorbing agent 15 and the pair of closed chambers 16 connected to the ultrasonic atomizing chamber 4 by way of opening/closing valves 18. In this ultrasonic separating apparatus, one of the opening/closing valves 18 can be opened to supply carrier gas including mist component into one of the closed chambers 16 and the other opening/closing valve 18 can be closed to remove gas from that closed chamber 16 and separate mist component from that adsorbing agent 15, and the opening/closing valves 18 can be opened and closed alternately to separate mist component from the carrier gas.

In the ultrasonic separating apparatus of the invention, the adsorption collecting part 9 can have a temperature control part 22. The temperature control part 22 can control the temperature of the adsorbing agent 15 as it adsorbs mist component from the carrier gas to below the temperature of the adsorbing agent 15 as mist component is separated from it.

The adsorbing agent 15 can be zeolite, activated carbon, lithium oxide, silica gel or a mixture of these.

This invention has the merit that a target substance included in the mist created from the solution can be recovered efficiently. In particular, there is the merit in this invention that mist component included in the mist can be collected by being caused to adsorb onto the adsorbing agent efficiently. This is because carrier gas including mist component atomized in the ultrasonic atomizing chamber is caused to adsorb onto an adsorbing agent in a collecting part, mist component adsorbed onto the adsorbing agent is separated from the carrier gas by being separated from the adsorbing agent, and the pressure at which mist component is separated from the adsorbing agent is made lower than the pressure at which mist component is caused to be adsorbed by the carrier gas being brought into contact with the adsorbing agent. The mist component adsorbing capacity of the adsorbing agent tends to increase as the pressure increases, and as the pressure decreases the mist component adsorbing capacity falls. Therefore, by effectively utilizing this characteristic of the adsorbing agent, that is, by making the pressure in the separating step lower than the pressure in the adsorbing step, it is possible to adsorb a large quantity of mist component onto the adsorbing agent efficiently in the adsorbing step, make the amount of mist component that can be adsorbed on the adsorbing agent small in the separating step, and separate and recover mist component from the adsorbing agent efficiently.

Also, the ultrasonic separating method of and the ultrasonic separating apparatus of in this invention have the merit that mist component included in a carrier gas can be efficiently adsorbed onto an adsorbing agent and recovered. This is because in this method and apparatus, the temperature of the adsorbing agent when it is adsorbing mist component in the carrier gas is made lower than the temperature of the adsorbing agent when mist component is being separated from it. The adsorbing capacity of the adsorbing agent decreases as its temperature increases and increases as its temperature decreases. Therefore, using this characteristic, by controlling the temperature of the adsorbing agent it is possible to separate and collect mist component included in the carrier gas efficiently.

Embodiments in accordance with the present invention shall be described hereinafter in conjunction with the accompanying drawings. It should be noted, however, that the ensuing description of embodiments is merely illustrative of the ULTRASONIC SOLUTION SEPARATING METHOD AND ULTRASONIC SEPARATING APPARATUS only to embody technical ideas conceived in the present invention and that the invention shall in no way be limited to the ULTRASONIC SEPARATING METHOD AND ULTRASONIC SEPARATING APPARATUS described below.

To add, in the present disclosure, reference numerals corresponding to members shown in the embodiments are affixed to members shown in the "CLAIMS" and "MEANS TO SOLVE THE PROBLEM" in order to facilitate a better understanding of the claims. However, those members shown in the claims shall in no way be specified to those members shown in the embodiments.

An ultrasonic solution separating method of the invention separates a specified solution of a high concentration from a solution containing at least two substances. Although the invention does not specify a solvent or a solute of the solution, water is a main solvent, and besides water organic solvents such as alcohol can also be used. The solution is for example one of the following.

(1) refined sake, beer, wine, table vinegar, mirin, spirits, Japanese 'shouchuu' spirits, brandy, whisky, liquor (2) any solution including a perfume, aromatic component or aroma component such as pinene, linalool, limonene, polyphenol (3) any solution including an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a substance in which these are combined (4) any solution including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a halogen (5) any solution including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a hydroxyl group (6) any solution including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with an amino group (7) any solution including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a carbonyl group (8) any solution including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a carboxyl group (9) any solution including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a nitro group

(10) any solution including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a cyano group

(11) any solution including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a mercapto group

(12) any solution including a substance in which any one or more atoms included in a solution of (3) to (11) above has been replaced with a metal ion

(13) any solution including a substance in which any hydrogen atom, carbon atom or functional radical in a molecule included in a solution of (3) to (11) above has been replaced with any molecule among molecules of (3) to (11) above When a solution including two or more substances is ultrasonically vibrated to separate a mist from the solution and the separated mist is condensed and collected, the solution collected from the mist and the remaining solution not having turned to mist have different concentrations of organic substances. For example, when an aqueous alcohol solution is atomized into mist by ultrasonic vibration and the atomized mist is collected, this has a higher concentration of alcohol than the remaining alcohol not having turned to mist. The reason for the alcohol concentration of the solution obtained by condensing and collecting the mist being high is that alcohol is more readily atomized into mist by ultrasonic vibration than water.

One reason why the concentrations of included organic substances in the solution collected from the mist and the solution not having turned to mist differ is that the rate at which substances included in the solution migrate to the surface and constitute a surface excess differ. Because a solution with a strong property of forming a surface excess will assume a high surface concentration, when this is ultrasonically vibrated to turn the solution at the surface into mist and atomize it, the mist has a high concentration of the substance that readily forms the surface excess. Accordingly, when this mist is condensed and collected, the concentration of the substance with a strong property of forming a surface excess can be made high. That is, it is possible to separate the substance from the solution at a high concentration.

A method and apparatus for, with alcohol as the solution, separating high-concentration alcohol from the alcohol, will now be shown. However, the present invention does not specify that the solution is alcohol. This is because the invention can be used for the separation of any of the solutions that it is possible to separate by atomizing into mist mentioned above, and for the separation of other solutions.

Ultrasonic separating apparatuses shown in FIG. 3 through FIG. 6 have an ultrasonic atomizer 1, 41, 51, 61 having an ultrasonic atomizing chamber 4, 44, 54, 64 of a closed structure to which a solution is supplied and one or a number of ultrasonic vibrators 2, 42, 52, 62 and ultrasound power sources 3, 43, 53, 63 for ultrasonically vibrating the solution in this ultrasonic atomizing chamber 4, 44, 54, 64 and atomizing it into mist; a collecting part 5, 45, 55, 65 for condensing and collecting a mist component atomized into mist from the solution in the ultrasonic atomizer 1, 41, 51, 61; and a blower 7, 47, 57, 67 for transferring the mist component atomized in the ultrasonic atomizing chamber 4, 44, 54, 64 to the collecting part 5, 45, 55, 65 together with a carrier gas. In the apparatuses shown in these figures, the mist component atomized into mist from the solution in the ultrasonic atomizing chamber 4, 44, 54, 64 is transferred to the collecting part 5, 45, 55, 65 together with the carrier gas by a blower 7, 47, 57, 67. However, although not shown in the drawings, alternatively a construction can be adopted wherein the mist is transferred using an electrostatic field or ultrasound.

The solution is supplied to the ultrasonic atomizing chamber 4, 44, 54, 64 by a pump 10, 410, 510, 610. The ultrasonic atomizing chamber 4, 44, 54, 64 does not atomize into mist all of the solution supplied to it. This is because if all of the solution were to be atomized and collected in the collecting part 5, 45, 55, 65, the concentration of the alcohol or other target substance in the solution collected in the collecting part 5, 45, 55, 65 would be the same as in the solution supplied to the ultrasonic atomizing chamber 4, 44, 54, 64. The concentration of the target substance in the solution supplied to the ultrasonic atomizing chamber 4, 44, 54, 64 falls as the solution is atomized into mist and decreases in volume. Consequently, the concentration of the target substance included in the mist also gradually falls. When its target substance concentration has fallen, the solution in the ultrasonic atomizing chamber 4, 44, 54, 64 is replaced with new solution.

The ultrasonic atomizing chamber 4, 44, 54, 64 for example atomizes a solution in which the concentration of the target substance is 10 to 50 wt %, and after the concentration of the target substance has fallen the solution is replaced with new solution. The solution is exchanged by the method of replacing the solution with a new one when a fixed time has elapsed, i.e. in batch fashion. However, it is also possible to connect a starting solution tank 11, 411, 511, 611 holding solution to the ultrasonic atomizing chamber 4, 44, 54, 64 by way of a pump 10, 410, 510, 610 and supply solution from the starting solution tank 11, 411, 511, 611 continuously. In this apparatus, solution from the starting solution tank 11, 411, 511, 611 is supplied as solution in the ultrasonic atomizing chamber 4, 44, 54, 64 is removed, and the target substance concentration of alcohol or the like in the solution in the ultrasonic atomizing chamber 4, 44, 54, 64 is thereby prevented from falling. And, as shown by the arrow A in FIG. 3, it is also possible for the solution in the ultrasonic atomizing chamber 4, 44, 54, 64 to be discharged to outside without being recirculated to the starting solution tank 11, 411, 511, 611, to prevent the concentration of the target substance included in the starting solution tank 11, 411, 511, 611 from falling.

The solution in the ultrasonic atomizing chamber 4, 44, 54, 64 is atomized into mist by the ultrasonic atomizer 1, 41, 51, 61. In mist atomized by the ultrasonic atomizer 1, 41, 51, 61, the concentration of the target substance is higher than in the solution. Therefore, by atomizing the solution into mist with the ultrasonic atomizer 1, 41, 51, 61 and then condensing and collecting the mist, it is possible to separate out a high-concentration solution with good efficiency.

The solution in the ultrasonic atomizing chamber 4, 44, 54, 64 is ultrasonically vibrated in the ultrasonic atomizer 1, 41, 51, 61 and forms a mist of a higher concentration than the solution in the ultrasonic atomizing chamber 4, 44, 54, 64 and disperses from the solution surface W. When the solution is ultrasonically vibrated, a liquid column P forms at the solution surface W, and mist arises from the surface of this liquid column P. In the ultrasonic atomizer 1 shown in FIG. 7, the ultrasonic vibrators 2 of the ultrasonic atomizer 1 are disposed facing upward at the bottom of the ultrasonic atomizing chamber 4 filled with solution. The ultrasonic vibrators 2 emit ultrasound upward from the bottom toward the solution surface W, ultrasonically vibrate the solution surface W, and create the liquid columns P. The ultrasonic vibrators 2 emit ultrasound vertically.

The ultrasonic atomizers 1 in the figures have multiple ultrasonic vibrators 2 and ultrasound power sources 3 for causing these ultrasonic vibrators 2 to ultrasonically vibrate. The ultrasonic vibrators 2 are fixed to the bottom of the ultrasonic atomizing chamber 4 in a watertight structure. An apparatus in which the solution is ultrasonically vibrated by multiple ultrasonic vibrators 2 atomizes the solution into mist efficiently.

When the ultrasonic vibrators 2 and the ultrasound power sources 3 heat the solution in the ultrasonic atomizing chamber 4, the quality of the solution deteriorates. This undesirable effect can be eliminated by forcibly cooling the ultrasonic vibrators 2. Preferably, the ultrasound power sources 3 are also cooled. Although the ultrasound power sources 3 do not heat the solution directly, they heat the solution indirectly by heating the surroundings. As shown in FIG. 7, the ultrasonic vibrators 2 and the ultrasound power sources 3 can be cooled by disposing a cooling pipe 14 in thermal contact with them, that is, disposing a cooling pipe 14 in contact with them. A liquid or coolant cooled in a cooler, or cooling water such as underground water or mains water, is passed through the cooling pipe 14 to cool the ultrasonic vibrators 2 and the ultrasound power sources 3.

Mist of solution atomized in the ultrasonic atomizing chamber 4, 44 54, 64 is fed into the collecting part 5, 45, 55, 65 with a carrier gas. To feed the mist into the collecting part 5, 45, 55, 65, the collecting part 5, 45, 55, 65 is connected to the ultrasonic atomizing chamber 4, 44, 54, 64 by a transfer duct 6, 46, 56, 66. The ultrasonic separating apparatuses shown in FIG. 3 and FIG. 6 have a construction wherein the carrier gas is circulated between the collecting part 5 and the ultrasonic atomizing chamber 4, 64 by a blower 7, 67. In these ultrasonic separating apparatuses, the carrier gas having been transferred from the ultrasonic atomizing chamber 4, 64 to the collecting part 5, 65 and had the mist component separated from it is returned to the ultrasonic atomizing chamber 4, 64. In these ultrasonic separating apparatuses, preferably the ultrasonic atomizing chamber 4, 64 and the collecting part 5, 65 are charged with an inactive gas as the carrier gas. In the apparatus, decomposition of the solution in the ultrasonic atomizing chamber 4, 64 and the collecting part 5, 65 is prevented by the inactive gas. Consequently, it is possible to obtain a high-concentration solution in a higher-quality state. However, air can alternatively be used as the carrier gas. And, in the ultrasonic separating apparatuses shown in FIG. 4 and FIG. 5, the carrier gas transferred from the ultrasonic atomizing chamber 44, 54 to the collecting part 45, 55 is released into the atmosphere without being returned to the ultrasonic atomizing chamber 44, 54 again. In these ultrasonic separating apparatuses, air is used as the carrier gas.

The collecting part 5, 45, 55, 65 separates from the carrier gas the mist component atomized in the ultrasonic atomizer 1, 41, 51, 61 and collects it. The collecting part 5, 45, 55, 65 has a first-stage collecting part 8, 48, 58, 68 for cooling the carrier gas and collecting the mist component from it and an adsorption collecting part 9, 49, 59, 69 for collecting mist component remaining in the carrier gas from which mist component has been separated in the first-stage collecting part 8, 48, 58, 68.

The first-stage collecting part 8, 48, 58, 68 condenses fine mist and collects it as a high-concentration alcohol solution. The first-stage collecting part 8, 48, 58, 68 shown in the figures contains in a chamber of a closed structure a cooler 12, 412, 512, 612 for cooling and condensing mist. The cooler 12, 412, 512, 612 in the figures is a heat-exchanger having fins (not shown) fixed to a heat-exchange pipe 13, 413, 513, 613. This cooler 12, 412, 512, 612 circulates a coolant or cooling water through the heat-exchange pipe 13, 413, 513, 613. However, the cooler can alternatively be made an electric cooler having a peltier device or the like. Some of the mist component atomized in the ultrasonic atomizing chamber 4, 44, 54, 64 evaporates into a gas, but this gas is cooled by the cooler 12, 412, 512, 612 of the first-stage collecting part 8, 48, 58, 68 and condenses and agglomerates and is collected. The mist component fed into the first-stage collecting part 8, 48, 58, 68 together with the carrier gas strikes the cooler 12, 412, 512, 612 or collides with other mist and agglomerates or strikes the fins of the cooler 12, 412, 512, 612 and greatly agglomerates and is collected as a solution. The carrier gas from which mist and gas have been agglomerated by the first-stage collecting part 8, 48, 58, 68 is transferred to the adsorption collecting part 9, 49, 59, 69. Because the mist is not a gas, it can be collected without necessarily having to be cooled. However, the mist can be collected rapidly by being cooled.

Although not shown in the figures, multiple baffle plates can be disposed inside the first-stage collecting part. The baffle plates are disposed in a vertical attitude with gaps between them through which mist can pass. Mist strikes the surfaces of the vertical baffle plates and agglomerates into a solution that falls and can be collected naturally. The surfaces of the baffle plates can be made undulating so that they touch and collect the mist more efficiently.

And, although it is not shown in the drawings, the first-stage collecting part may be provided with a fan for forcibly blowing and agitating the carrier gas. The fan blows the carrier gas in the collecting part and agitates the mist and vapor. The agitated mist collides with itself and agglomerates, or strikes the surfaces of the baffle plates and is agglomerated. The agglomerated mist rapidly falls and is collected.

Also, although it is not shown in the drawings, the first-stage collecting part can be provided with a mist vibrator for vibrating the mist and increasing the probability of it colliding. A mist vibrator has an electrical oscillation-mechanical vibration convertor for vibrating the carrier gas in the collecting part, and an oscillating drive source for driving this electrical oscillation-mechanical vibration convertor. The electrical oscillation-mechanical vibration convertor is a speaker for emitting sound at an audible frequency or an ultrasound vibrator for emitting ultrasound higher than audible frequencies. So that the electrical oscillation-mechanical vibration convertor vibrates the mist efficiently, the vibration emitted from the electrical oscillation-mechanical vibration convertor is made to resonate in the first-stage collecting part. To realize this, the electrical oscillation-mechanical vibration convertor is made to vibrate at a resonating frequency in the first-stage collecting part. In other words, the first-stage collecting part is designed to a shape such that it will resonate with the vibration emitted from the electrical oscillation-mechanical vibration convertor.

Because ultrasound is a high frequency above frequencies audible to humans, it is not heard by the ears. Consequently, even when the mist vibrators emitting ultrasound vibrate the gas in the first-stage collecting part violently, in other words, when the output of the electrical oscillation-mechanical vibration convertor is made extremely large, there is no harming of people with noise. Because of this, there is the merit that with ultrasound the mist can be vibrated violently and made to collide efficiently and collected rapidly.

In the first-stage collecting part described above, because a device for agglomerating mist efficiently is provided, mist can be agglomerated into a high-concentration solution more rapidly. Also, although it is not illustrated in the drawings, the first-stage collecting part can incorporate all of nozzles for spraying solution, a fan for agitating the mist, and a vibrator for vibrating the mist, whereby the mist can be agglomerated with maximal efficiency. And, alternatively two of these devices for agglomerating the mist can be incorporated to agglomerate the mist efficiently.

The adsorption collecting part 9, 49, 59, 69 collects mist component remaining in the carrier gas from which mist component has been separated in the first-stage collecting part 8, 48, 58, 68 by adsorbing it onto an adsorbing agent 15, 415, 515, 615. The adsorption collecting part 9, 49, 59, 69 separates mist component from the carrier gas by an adsorbing step of adsorbing mist component onto the adsorbing agent 15, 415, 515, 615 by bringing the carrier gas including mist component into contact with the adsorbing agent 15, 415, 515, 615 and a separating step of separating from the adsorbing agent 15, 415, 515, 615 and recovering mist component adsorbed onto the adsorbing agent 15, 415, 515, 615 in the adsorbing step. Also, the adsorption collecting part 9, 49, 59, 69 separates mist component from the carrier gas by making the pressure in the separating step lower than the pressure in the adsorbing step. That is, the adsorption collecting part 9, 49, 59, 69 separates mist component from the carrier gas by making the pressure at which mist component is separated from the adsorbing agent 15, 415, 515, 615 lower than the pressure at which the carrier gas is brought into contact with the adsorbing agent 15, 415, 515, 615 to adsorb mist component.

Figure 8:
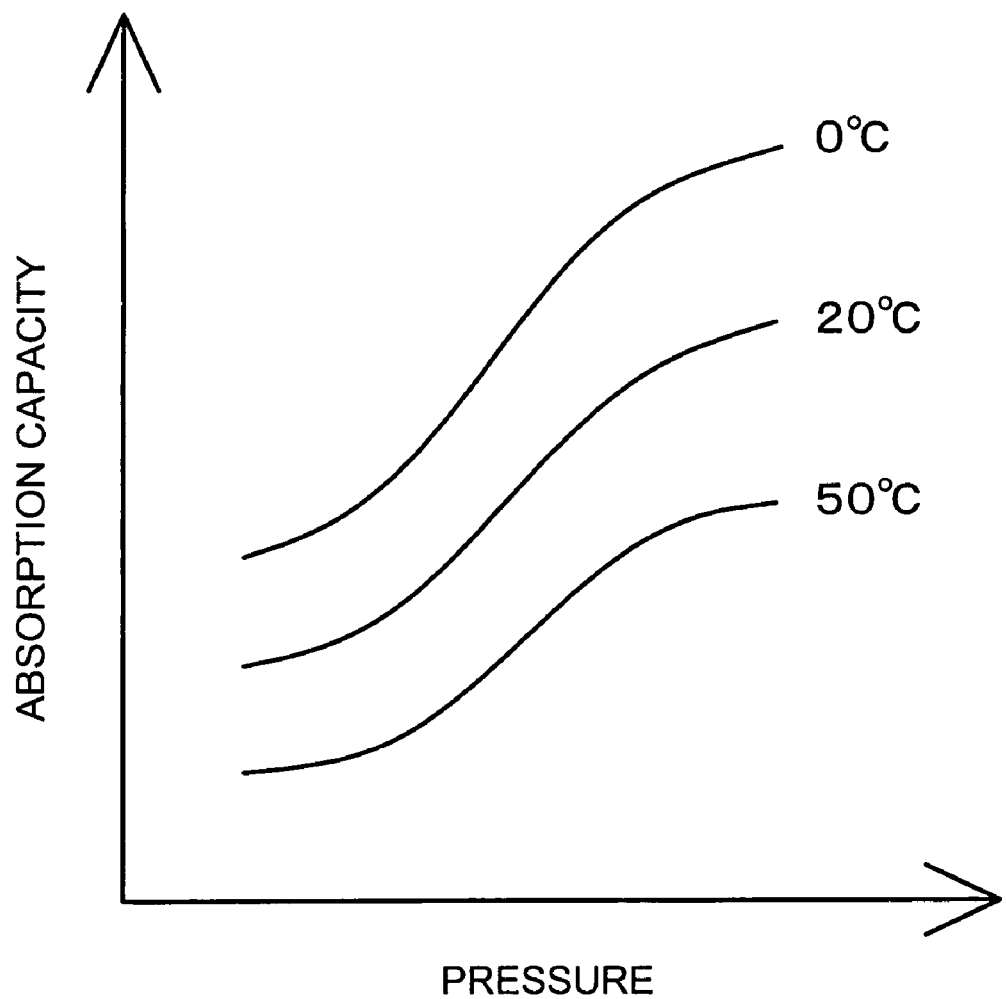

The reason for making the pressure in the separating step lower than the pressure in the adsorbing step is that the adsorbing capacity of the adsorbing agent 15, 415, 515, 615 varies with pressure. FIG. 8 is a graph showing how the amount of mist component that the adsorbing agent adsorbs varies with pressure and temperature. The characteristic with which the adsorbing agent adsorbs mist component depends on the type of the adsorbing agent and the type of the mist component constituting the target substance, but generally there is the trend shown in this graph. That is, at a given temperature, the adsorbing capacity of the adsorbing agent increases when the pressure rises and decreases when the pressure falls. And, at a given pressure, the adsorbing capacity of the adsorbing agent decreases when the temperature rises and increases when the temperature falls. The separating method and apparatus of this invention utilize this characteristic to separate and recover mist component included in the carrier gas efficiently. That is, by the pressure in the separating step being made lower than the pressure in the adsorbing step, in the adsorbing step a large quantity of mist component is adsorbed onto the adsorbing agent and in the separating step the amount of mist component that can be adsorbed onto the adsorbing agent is reduced and the mist component is separated from the adsorbing agent and collected.

The adsorption collecting part 9, 49, 59, 69 has a closed chamber 16, 416, 516, 616 filled with the adsorbing agent 15, 415, 515, 615; opening/closing valves 18, 418, 518, 618 for controlling the flow of carrier gas in and out of this closed chamber 16; and a vacuum pump 17, 417, 517, 617, connected to the closed chamber 16, 416, 516, 616, for emptying the closed chamber 16, 416, 516, 616 of gas.

The closed chamber 16, 416, 516, 616 is a closed vessel and its inside is filled with the adsorbing agent 15, 415, 515, 615. As the adsorbing agent 15, 415, 515, 615, for example zeolite, activated carbon, lithium oxide or silica gel, or a mixture of these, is used. The closed chamber 16, 416, 516, 616 is connected by the transfer duct 6, 46, 56, 66 to the outlet side of the first-stage collecting part 8, 48, 58, 68, and carrier gas flowing in from the first-stage collecting part 8, 48, 58, 68 is passed through the adsorbing agent 15, 415, 515, 615 so that mist component contained in the carrier gas is adsorbed onto the adsorbing agent 15, 415, 515, 615. Also, the closed chambers 16, 616 shown in FIG. 3 and FIG. 6 have their carrier gas discharge side connected by the transfer duct 6, 66 to the ultrasonic atomizing chamber 4, 64, and the closed chamber 416 of FIG. 4 has its carrier gas discharge side open to the atmosphere. The opening/closing valves 18, 418, 518, 618 are provided in the transfer duct 6, 46, 56, 66 connected to the inlet side and the outlet side of the closed chamber 16, 416, 516, 616. In the adsorption collecting part 9, 49, 59, 69, with the opening/closing valves 18, 418, 518, 618 open carrier gas containing mist component is supplied into the closed chamber 16, 416, 516, 616, and the mist component contained in the carrier gas is adsorbed onto the adsorbing agent 15, 415, 515, 615.

Also, the closed chambers 16, 416, 516, 616 shown in the figures have their carrier gas outlet side connected by a suction duct 19, 419, 519, 619 to the vacuum pump 17, 417, 517, 617. The vacuum pump 17, 417, 517, 617 forcibly removes gas from the closed chamber 16, 416, 516, 616 and lowers the pressure of the closed chamber 16, 416, 516, 616. When the pressure is lowered, because the amount of mist component that the adsorbing agent 15, 415, 515, 615 can adsorb decreases, mist component that can no longer be adsorbed is separated from the adsorbing agent 15, 415, 515, 615 and removed. The vacuum pump 17, 417, 517, 617 evacuating the closed chamber 16, 416, 516, 616 separates mist component from the adsorbing agent 15, 415, 515, 615 and removes it. The gas taken in by the vacuum pump 17, 417, 517, 617 is cooled by a cooler 21, 421, 521, 621. The cooler 21, 421, 521, 621 and a suction valve 20, 420, 520, 620 are connected between the closed chamber 16, 416, 516, 616 and the vacuum pump 17, 417, 517, 617. Gas sucked out of the closed chamber 16, 416, 516, 616 by the vacuum pump 17, 417, 517, 617 flows into the cooler 21, 421, 521, 621. The cooler 21, 421, 521, 621 cools the evacuated gas separated from the adsorbing agent 15, 415, 515, 615 in the closed chamber 16, 416, 516, 616 and condenses or agglomerates the mist component it contains and collects it as a liquid.

Although it is not illustrated in the figures, in the ultrasonic separating apparatus, the cooler for cooling the recovered gas and the cooler of the first-stage collecting part for cooling the carrier gas can alternatively be cooled with a single chiller. With this construction, because it is possible to cool two coolers with a single cooling chiller, the overall construction can be made simple.

Figure 5:
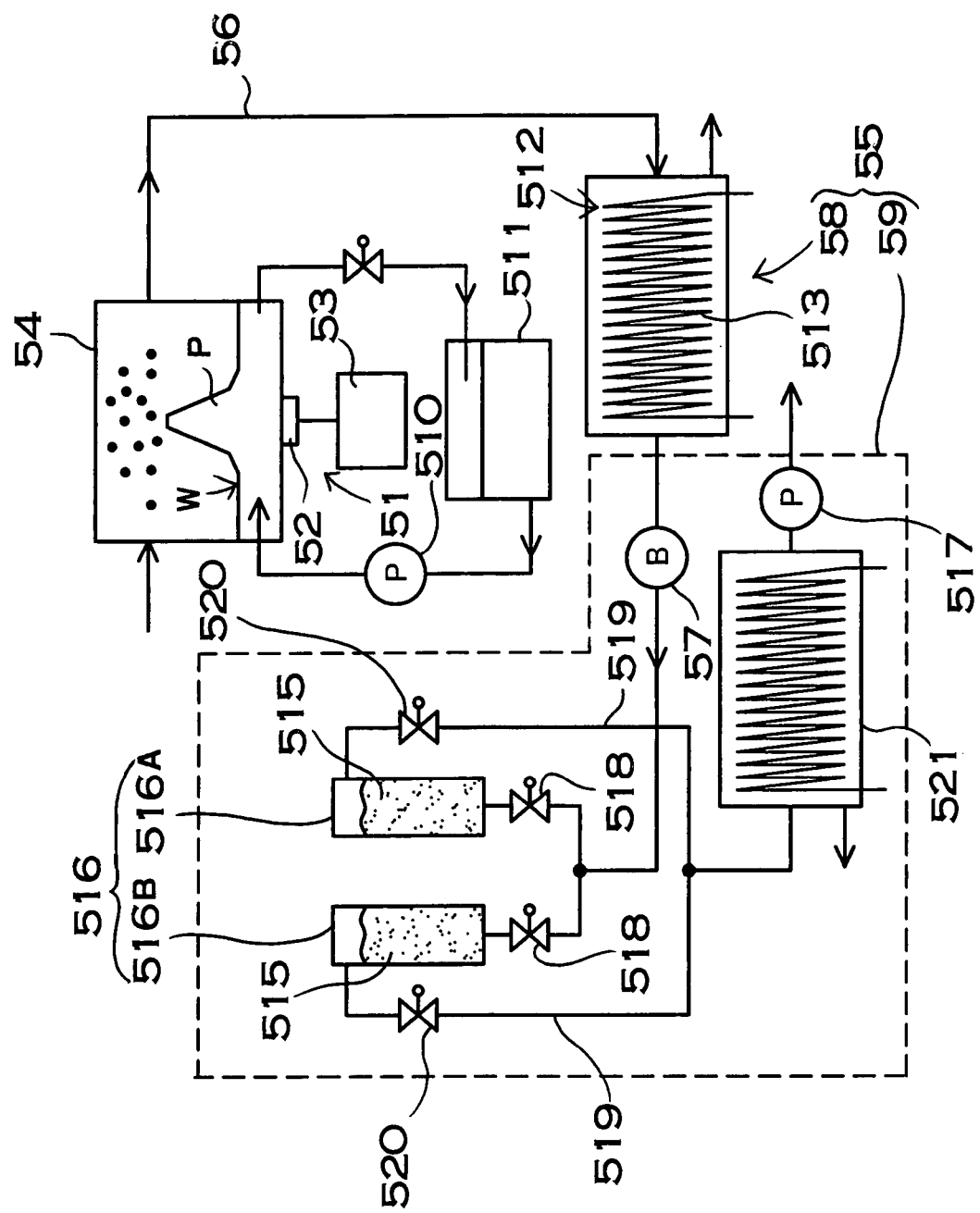

The ultrasonic separating apparatus shown in FIG. 5 has the blower 57 disposed between the first-stage collecting part 58 and the adsorption collecting part 59. In this ultrasonic separating apparatus, carrier gas circulated by the blower 57 is supplied to the adsorption collecting part 59 in a pressurized state. The blower 57 can supply carrier gas pressurized to a high higher pressure than atmospheric pressure to the adsorption collecting part 59. An ultrasonic separating apparatus in which the carrier gas supplied to the adsorption collecting part 59 is pressurized has the merit that the adsorbing capacity of the adsorbing agent 515 in the adsorbing step can be increased. Consequently, mist component can be separated from the carrier gas still more efficiently. However, alternatively the pressure of the carrier gas supplied to the closed chamber of the adsorption collecting part can be adjusted by individually controlling the opening/closing valve connected to the inlet side of the closed chamber and the opening/closing valve connected to the discharge side of the closed chamber. Also, in the ultrasonic separating apparatus the supplied carrier gas does not necessarily have to be raised to above atmospheric pressure, and can alternatively be at atmospheric pressure.

Also, the adsorption collecting parts 9, 419, 519, 619 shown in the figures have a pair of closed chambers 16, 416, 516, 616 made up of a first closed chamber 16A, 416A, 516A, 616A and a second closed chamber 16B, 416B, 516B, 616B. An adsorption collecting part 9, 49, 59, 69 of this construction has the merit that mist component can be separated efficiently with the pair of closed chambers 16, 416, 516, 616 by switching the pair of closed chambers 16, 416, 516, 616 between the adsorbing step and the separating step. An adsorption collecting part 9, 49, 59, 69 of this construction separates mist component from the carrier gas in the following way.

(1) The opening/closing valve 18, 418, 518, 618 of the first closed chamber 16A, 416A, 516A, 616A is opened and the opening/closing valve 18, 418, 518, 618 of the second closed chamber 16B, 416B, 516B, 616B and the suction valve 20, 420, 520, 620 of the first closed chamber 16A, 416A, 516A, 616A are closed. In this state, carrier gas supplied from the first-stage collecting part 8, 48, 58, 68 is fed into the first closed chamber 16A, 416A, 516A, 616A and adsorbed by the adsorbing agent 15, 415, 515, 615 inside this first closed chamber 16A, 416A, 516A, 616A.

(2) After a predetermined time elapses, the opening/closing valve 18, 418, 518, 618 of the first closed chamber 16A, 416A, 516A, 616A and the suction valve 20, 420, 520, 620 of the second closed chamber 16B, 416B, 516B, 616B are closed, and the opening/closing valve 18, 418, 518, 618 of the second closed chamber 16B, 416B, 516B, 616B is opened. In this state, carrier gas supplied from the first-stage collecting part 8, 48, 58, 68 is not fed into the first closed chamber 16A, 416A, 516A, 616A but is fed into the second closed chamber 16B, 416B, 516B, 616B and adsorbed by the adsorbing agent 15, 415, 515, 615 in the second closed chamber 16B, 416B, 516B, 616B.

(3) The suction valve 20, 420, 520, 620 of the first closed chamber 16A, 416A, 516A, 616A is opened and the first closed chamber 16A, 416A, 516A, 616A is emptied of gas by the vacuum pump 17, 417, 517, 617. The first closed chamber 16A, 416A, 516A, 616A is reduced in pressure, and mist component is separated from the adsorbing agent 15, 415, 515, 615.

(4) Mist component separated from the adsorbing agent 15, 415, 515, 615 of the first closed chamber 16A, 416A, 516A, 616A is removed from the first closed chamber 16A, 416A, 516A, 616A and fed into the cooler 21, 421, 521, 621 and is cooled and condensed, agglomerated and collected in the cooler 21, 421, 521, 621.

(5) Also, after a predetermined time elapses, the opening/closing valve 18, 418, 518, 618 of the first closed chamber 16A, 416A, 516A, 616A is opened, and the opening/closing valve 18, 418, 518, 618 of the second closed chamber 16B, 416B, 516B, 616B and the suction valve 20, 420, 520, 620 of the first closed chamber 16A, 416A, 516A, 616A are closed. In this state, carrier gas supplied from the first-stage collecting part 8, 48, 58, 68 is not fed into the second closed chamber 16B, 416B, 516B, 616B but is fed into the first closed chamber 16A, 416A, 516A, 616A and is adsorbed by the adsorbing agent 15, 415, 515, 615 in the first closed chamber 16A, 416A, 516A, 616A.

(6) The suction valve 20, 420, 520, 620 of the second closed chamber 16B, 416B, 516B, 616B is closed and the second closed chamber 16B, 416B, 516B, 616B is emptied of gas by the vacuum pump 17, 417, 517, 617. The second closed chamber 16B, 416B, 516B, 616B is reduced in pressure, and mist component is separated from the adsorbing agent 15, 415, 515, 615.

(7) The mist component separated from the adsorbing agent 15, 415, 515, 615 in the second closed chamber 16B, 416B, 516B, 616B is removed from the second closed chamber 16B, 416B, 516B, 616B and fed into the cooler 21, 421, 521, 621 and is cooled and condensed, agglomerated and collected in the cooler 21, 421, 521, 621.

(8) The steps of (2) to (7) are repeated, that is, the opening/closing valves 18 are alternately opened and closed, and mist component is separated from the carrier gas in the pair of closed chambers 16, 416, 516, 616.

Also, in the adsorption collecting part 9, 49, 59, 69, mist component can be recovered from the carrier gas more efficiently by the temperature of the adsorbing agent in the adsorption step being made lower than the temperature of the adsorbing agent in the separating step. As mentioned above, this is because the adsorbing capacity of the adsorbing agent varies also with temperature. In the adsorption collecting part, for example, in the adsorption step, the adsorbing capacity of the adsorbing agent can be increased by cooling it.

Figure 3:
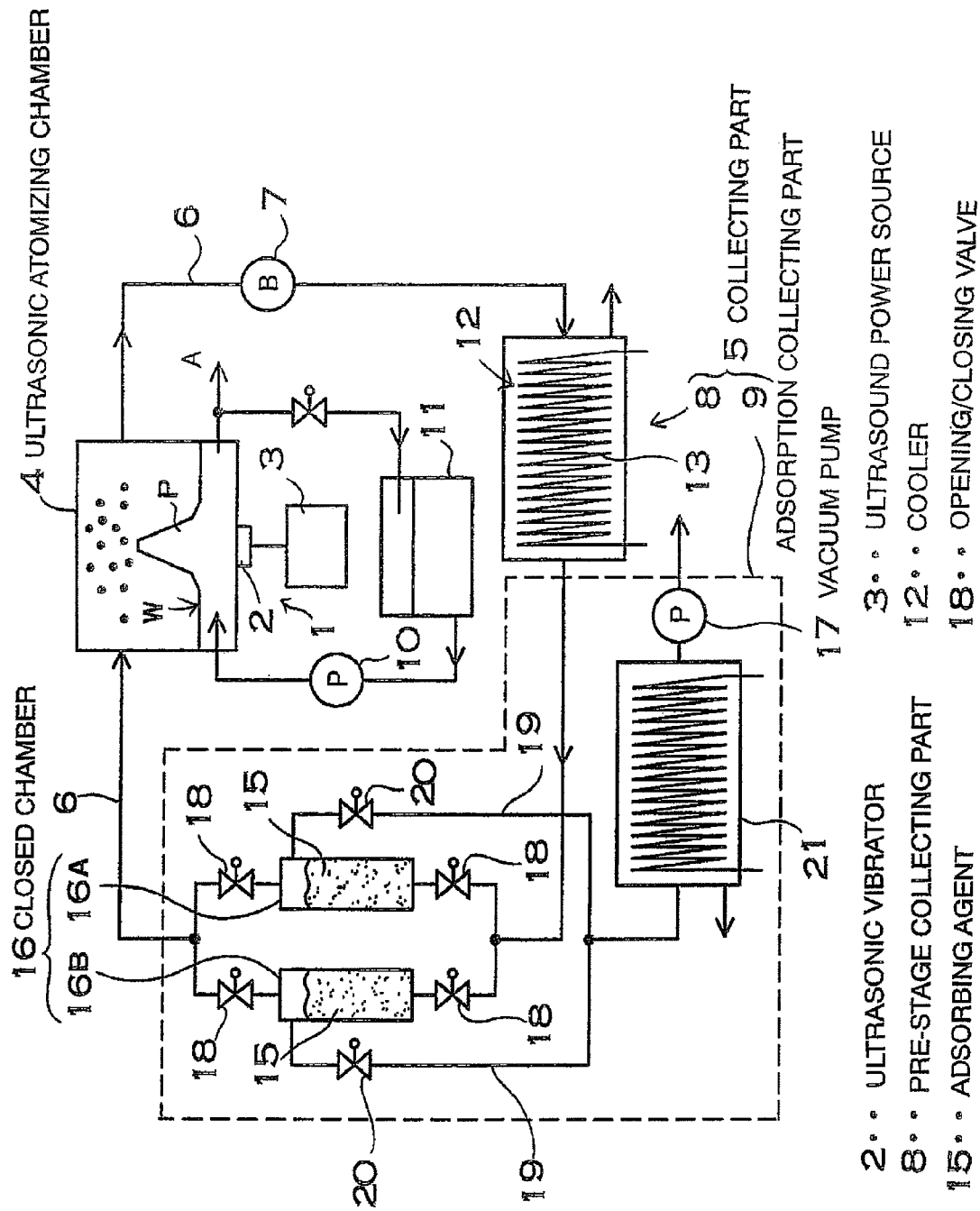
Figure 4:
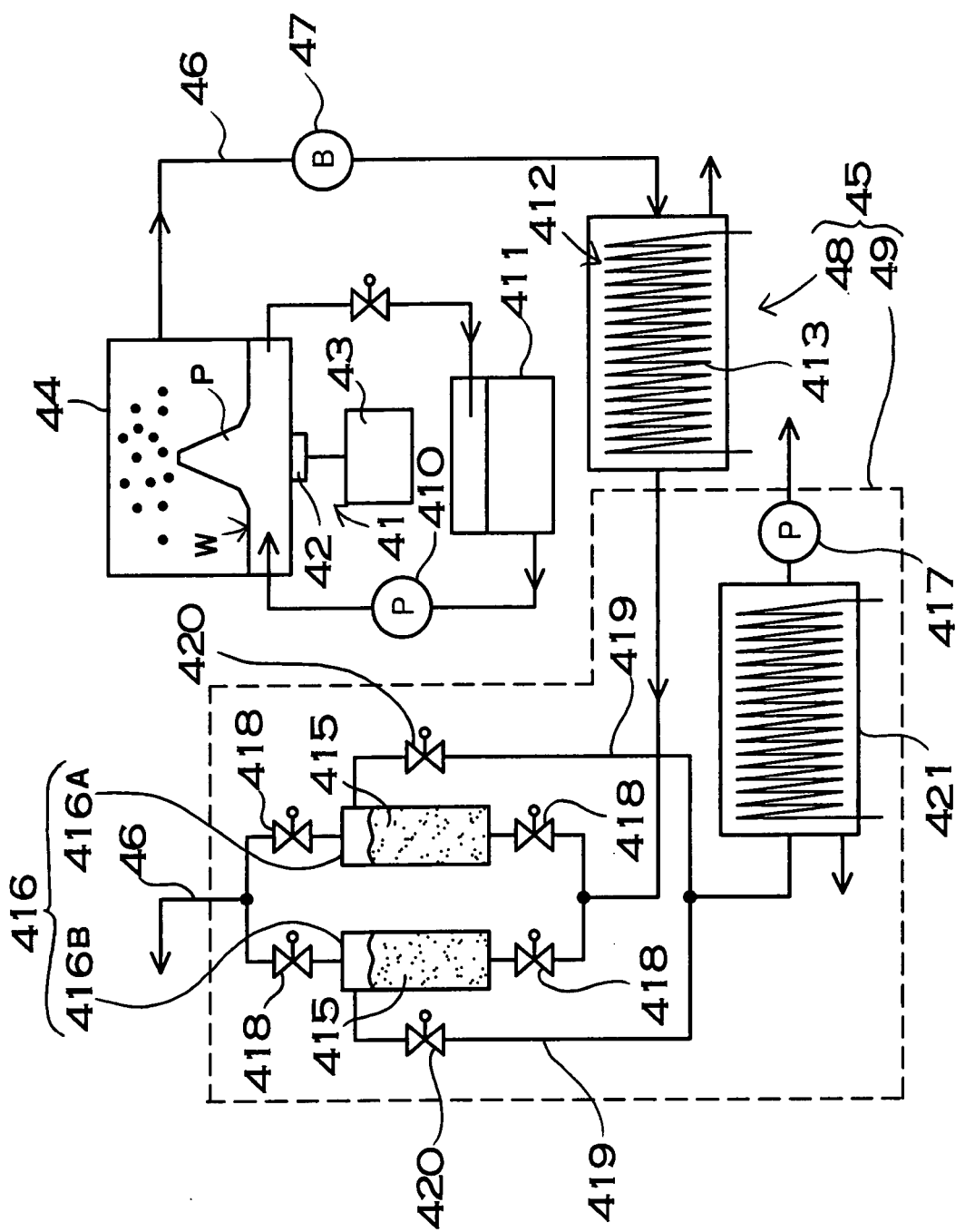

As shown in FIG. 3 through FIG. 5, in a collecting part 5, 45, 55 having the first-stage collecting part 8, 48, 58 as a cooler 12, 412, 512, because the carrier gas is cooled when it passes through the cooler 12, 412, 512, carrier gas fed into the adsorption collecting part 9, 49, 59 through the first-stage collecting part 8, 48, 58 is cooled by the cooler 12. In the closed chamber 16, 416, 516 to which this cooled carrier gas is supplied, because the adsorbing agent 15, 415, 515 is cooled by this carrier gas, the amount of the mist component adsorbed in the adsorbing step increases and a large amount of mist component included in the carrier gas is adsorbed. However, in the collecting part, alternatively a temperature control part for cooling the adsorbing agent can be provided in the adsorption collecting part and the adsorbing agent cooled with this temperature control part. This temperature control part for example is a cooler and is disposed inside the closed chamber and cools the adsorbing agent. As the cooler, for example a cooling heat-exchanger or an electronic cooler can be used.

Also, in the adsorption collecting part, the adsorbing agent can be heated in the separating step. Because the amount of mist component that can be adsorbed by heated adsorbing agent is lower, the adsorbed mist component can be separated efficiently. Although it is not illustrated in the drawings, this adsorption collecting part has a temperature control part for heating the adsorbing agent. This temperature control part for example is a heater and is disposed inside the closed chamber and heats the closed chamber. As the heater, a heating heat-exchanger or an electric heater can be used.

Figure 6:
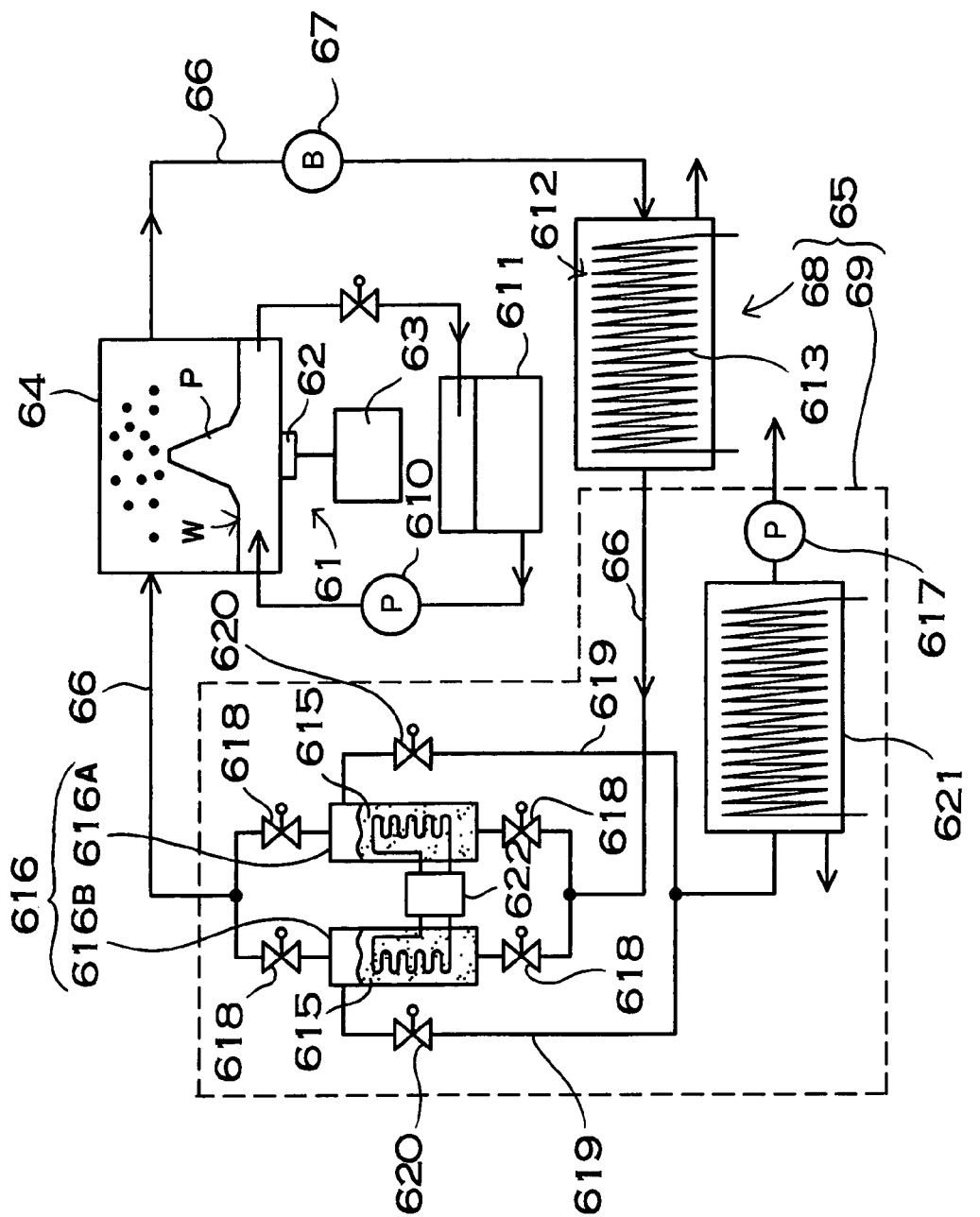
Figure 7:
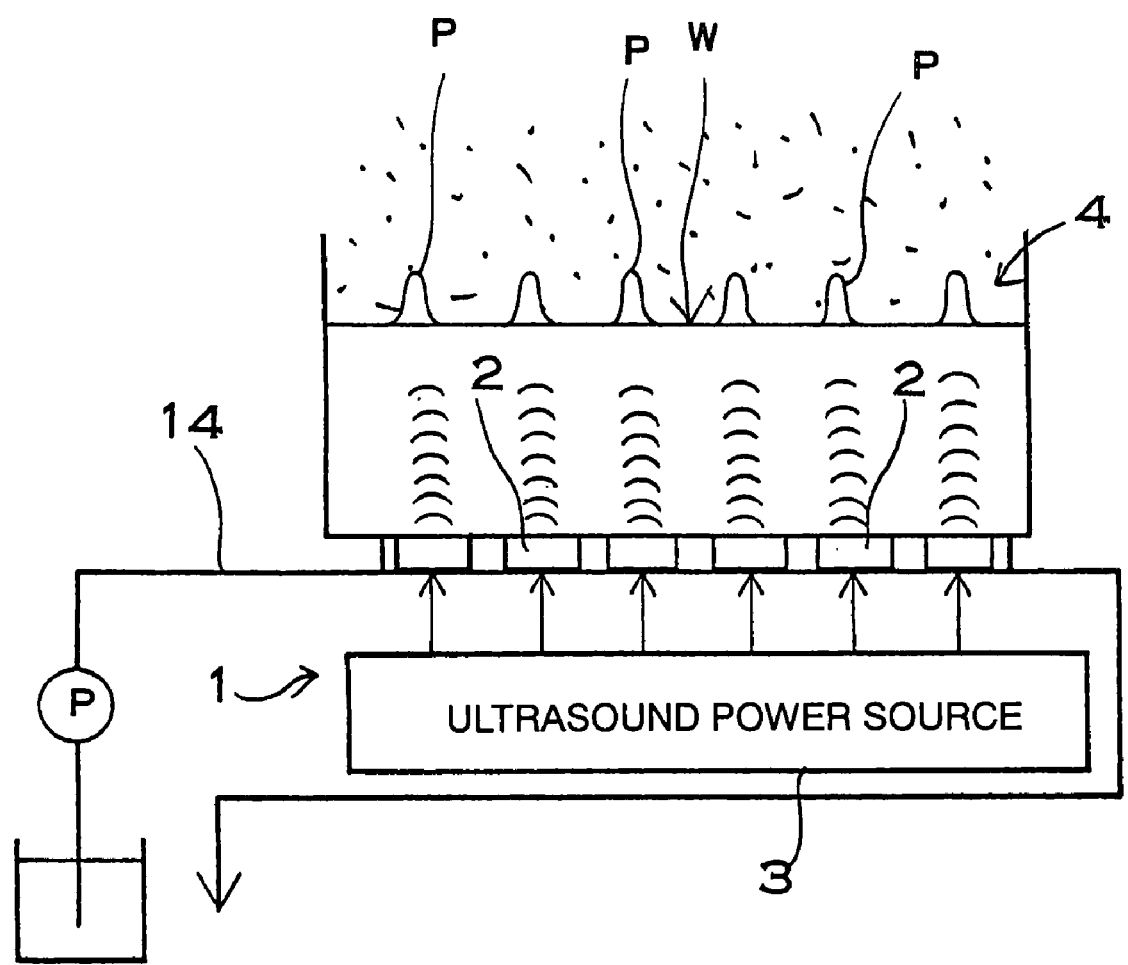
Figure 9:
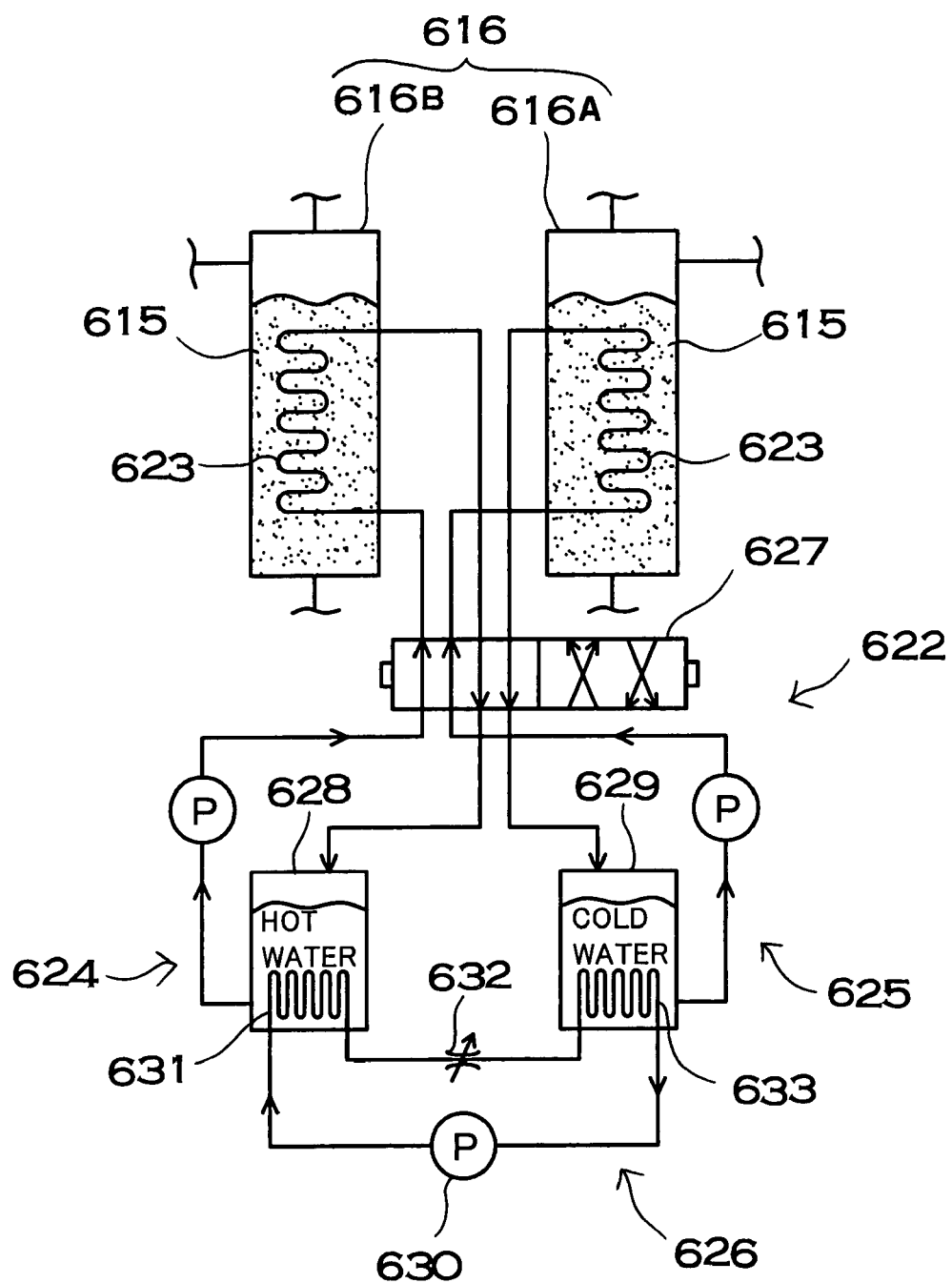

Also, the adsorption collecting part 69 of FIG. 6 has a temperature control part 622 in order to control the temperature of the adsorbing agent 615 filled in the closed chamber 616. This temperature control part 622 is constructed so that it can cool and heat the adsorbing agent 615 in the closed chambers 616. This temperature control part 622 is shown in FIG. 9.

The temperature control part 622 shown in this figure has heat-exchangers 623 disposed inside the closed chambers 16, a heating mechanism 624 for circulating hot water through the heat-exchanger 623 of one of the closed chambers 616, a cooling mechanism 625 for circulating cold water through the other closed chamber 616, a control valve 627 for switching the hot water and the cold water circulated to the closed chambers 616, and a refrigerating circuit 626 for heating a hot water tank 628 of the heating mechanism 624 and cooling a cold water tank 629 of the cooling mechanism 625.

The heat-exchangers 623 are disposed inside the closed chambers 616. Each of the heat-exchangers 623 heats the respective adsorbing agent 615 when hot water is circulating through it and cools the adsorbing agent 615 when cold water is circulating through it. The heating mechanism 624 has a radiator 631 of the refrigerating circuit 626 disposed inside the hot water tank 628 and circulates hot water heated by the radiator around the circulation path to heat either of the closed chambers 616. The cooling mechanism 625 has a cooling element 633 of the refrigerating circuit 626 disposed inside the cold water tank 629 and circulates cold water cooled by the cooling element around the circulation path to cool either of the closed chambers 616. However, the heating mechanism and the cooling mechanism can alternatively circulate a coolant other than water.

The refrigerating circuit 626 has a compressor 630 for compressing evaporated coolant; the radiator 631, which liquefies coolant compressed by the compressor 630; the cooling element 633, which effects forcible cooling with heat of vaporization of the liquefied coolant; and an expansion valve 632 connected between the radiator 631 and the cooling element 633. The expansion valve 632 causes pressurized and cooled liquefied coolant to expand adiabatically inside the cooling element 633 and thereby forcibly cools the cooling element 633 with heat of vaporization of the coolant. In this refrigerating circuit 626, the aperture of the expansion valve 632 and the output of the compressor 630 are regulated to keep the temperatures of the radiator 631 and the expansion valve 632 to predetermined temperatures.

In a temperature control part 622 of the construction described above, the control valve 627 is switched to circulate hot water to the heat-exchanger 623 in one of the closed chambers 616 and heat it and circulate cold water to the heat-exchanger 623 in the other closed chamber 616 and cool it. Because a temperature control part 622 of this construction can heat and cool the pair of closed chambers 616 with a single refrigerating circuit 626, the adsorbing agent 615 inside each of the pair of closed chambers 616 can be temperature-controlled efficiently. In an adsorption collecting part 69 having a pair of closed chambers 616, when one of the closed chambers 616 is in the adsorbing step, the other closed chamber 616 is in the separating step. Therefore, this temperature control part 622 can both cool the closed chamber 616 in the adsorbing step so that mist component can be adsorbed onto the adsorbing agent 615 efficiently and heat the closed chamber 616 in the separating step so that mist component adsorbed onto the adsorbing agent 615 can be recovered efficiently.

Also, in an adsorption collecting part 69 in which the adsorbing agent 615 is heated with a temperature control part 622, because the carrier gas circulated from the adsorption collecting part 69 to the ultrasonic atomizing chamber 64 can be heated, there is the merit that mist can be created efficiently in the ultrasonic atomizing chamber 64. This is because the degree to which solution is atomized to mist in the ultrasonic atomizing chamber 64 varies with the temperatures of the solution and the carrier gas, and when the temperatures of the carrier gas and the solution are high the amount of mist created increases. The temperature control part 622 heats the carrier gas to 25 to 30° C. However, the temperature control part 622 can supply carrier gas to the ultrasonic atomizing chamber 64 heated to 15 to 40° C. When the temperature of the carrier gas supplied to the ultrasonic atomizing chamber 64 is high the amount of mist created is high, but when the temperature is too high the alcohol or other target substance decomposes. Conversely, when the temperature is low, the efficiency with which the target substance is turned to mist is low.

INDUSTRIAL APPLICABILITY

The ultrasonic solution separating method and ultrasonic separating apparatus in this invention is applicable for separating out a high-concentration solution with a high concentration of a target substance from a mixture including two or more substances, or separating out a target substance included in a solution, to be able to separate high-concentration alcohol solution from low-concentration alcohol solution

BRIEF DESCRIPTION OF THE DRAWINGS

FIG. 1 is a schematic sectional view showing a column of liquid is forming at the surface of a solution being ultrasonically vibrated;

FIG. 2 is a graph showing a curve of the amount of saturated water vapor that air can contain;

FIG. 3 is a schematic construction view showing an ultrasonic separating apparatus according to a first embodiment of the invention;

FIG. 4 is a schematic construction view showing an ultrasonic separating apparatus according to another embodiment of the invention;

FIG. 5 is a schematic construction view showing an ultrasonic separating apparatus according to another embodiment of the invention;

FIG. 6 is a schematic construction view showing an ultrasonic separating apparatus according to another embodiment of the invention;

FIG. 7 is a schematic sectional view showing an example of an ultrasonic atomizing chamber and an ultrasonic atomizer;

FIG. 8 is a graph showing how the adsorbing capacity of an adsorbing agent varies with pressure and temperature; and FIG. 9 is a schematic construction view showing an example of a temperature control part.

DENOTATION OF REFERENCE NUMERALS

1, 41, 51, 61 . . . ultrasonic atomizer
2, 42, 52, 62 . . . ultrasonic vibrator
3, 43, 53, 63 . . . ultrasound power source
4, 44, 54, 64 . . . ultrasonic atomizing chamber
5, 45, 55, 65 . . . collecting part
6, 46, 56, 66 . . . transfer duct
7, 47, 57, 67 . . . blower
8, 48, 58, 68 . . . first-stage collecting part
9, 49, 59, 69 . . . adsorption collecting part
10, 410, 510, 610 . . . pump
11, 411, 511, 611 . . . starting solution tank
12, 412, 512, 612 . . . cooler
13, 413, 513, 613 . . . heat-exchange pipe
14 . . . cooling pipe
15, 415, 515, 615 . . . adsorbing agent
16, 416, 516, 616 . . . closed chamber
16A, 416A, 516A, 616A . . . first closed chamber
16B, 416B, 516B, 616B . . . second closed chamber
17, 417, 517, 617 . . . vacuum pump
18, 418, 518, 618 . . . opening/closing valve
19, 419, 519, 619 . . . suction duct
20, 420, 520, 620 . . . suction valve
21, 421, 521, 621 . . . cooler
622 . . . temperature control part
623 . . . heat-exchanger
624 . . . heating mechanism
625 . . . cooling mechanism
626 . . . refrigerating circuit
627 . . . control valve
628 . . . hot water tank
629 . . . cold water tank
630 . . . compressor
631 . . . radiator
632 . . . expansion valve
633 . . . cooling element
104 . . . ultrasonic atomizing chamber
105 . . . collecting part
W . . . solution surface
P . . . liquid column

The invention claimed is:

1. An ultrasonic solution separating method for separating mists from a carrier gas, the method comprising the steps of:

ultrasonically vibrating a solution in an ultrasonic atomizing chamber and atomizing the solution into mists in a carrier gas;

transferring the carrier gas containing the atomized mists to a collecting part;

contacting the carrier gas containing the mists with an adsorbing agent to adsorb the mists onto the adsorbing agent in the collecting part; and separating the mists from the adsorbing agent and collecting the mists, wherein the pressure of the step of separating the mists from the adsorbing agent is lower than the pressure of the adsorbing the mists onto the adsorbing agent.

2. The ultrasonic solution separating method according to claim 1, wherein in the collecting part the carrier gas is cooled with a cooler and the mist is separated from it and then the carrier gas is brought into contact with the adsorbing agent and the mist is adsorbed onto the adsorbing agent.

3. The ultrasonic solution separating method according to claim 1, wherein in the separating step the mist is separated from the adsorbing agent with the adsorbing agent disposed in a closed chamber and carrier gas being removed from the closed chamber with a vacuum pump and the closed chamber being reduced in pressure to a pressure lower than atmospheric pressure.

4. The ultrasonic solution separating method according to claim 3, wherein in the adsorbing step the mist in the carrier gas is adsorbed onto the adsorbing agent with the adsorbing agent disposed in a closed chamber at atmospheric pressure.

5. The ultrasonic solution separating method according to claim 1, wherein in the adsorbing step the mist in the carrier gas is adsorbed onto the adsorbing agent with the adsorbing agent disposed in a closed chamber pressurized to a pressure higher than atmospheric pressure.

6. The ultrasonic solution separating method according to claim 1, wherein the temperature of the adsorbing agent in the adsorbing step is made lower than the temperature of the adsorbing agent in the separating step.

7. An ultrasonic solution separating apparatus, comprising:

a ultrasonic atomizing chamber to which a solution is supplied;

an ultrasonic vibrator for ultrasonically vibrating the solution in this ultrasonic atomizing chamber and atomizing into a mist and dispersing it in a carrier gas;

an ultrasound power source connected to this ultrasonic vibrator for supplying high-frequency electrical power to the ultrasonic vibrator and causing it to ultrasonically vibrate; and a collecting part for adsorbing onto an adsorbing agent and separating from the adsorbing agent the mist atomized by the ultrasonic vibrator and transferred with a carrier gas, wherein the collecting part has an adsorption collecting part that separates the mist included in the carrier gas from the carrier gas by adsorbing the mist onto the adsorbing agent by bringing the carrier gas into contact with the adsorbing agent and then separating the adsorbed mist from the adsorbing agent, and wherein the adsorption collecting part makes the pressure at which it separates the mist from the adsorbing agent lower than the pressure at which it causes the mist to be adsorbed by bringing the carrier gas into contact with the adsorbing agent.

8. The ultrasonic separating apparatus according to claim 7, wherein the collecting part has a first-stage collecting part for collecting the mist by cooling the carrier gas, and carrier gas having had the mist separated from it in this first-stage collecting part is supplied to the adsorption collecting part.

9. The ultrasonic separating apparatus according to claim 7, wherein in the adsorption collecting part a closed chamber is filled with the adsorbing agent and a vacuum pump is connected to this closed chamber and the vacuum pump removes gas from this closed chamber to separate the mist from the adsorbing agent.

10. The ultrasonic separating apparatus according to claim 9, wherein the closed chamber is connected to the ultrasonic atomizing chamber by way of an opening/closing valve and the opening/closing valve is opened to supply carrier gas including the mist from the ultrasonic atomizing chamber into the closed chamber and cause the mist to be adsorbed onto the adsorbing agent and the opening/closing valve is closed to reduce the pressure of the closed chamber and separate the mist from the adsorbing agent.

11. The ultrasonic separating apparatus according to claim 10, wherein a pair of closed chambers are filled with adsorbing agent and the pair of closed chambers are connected to the ultrasonic atomizing chamber by way of opening/closing valves and one of the opening/closing valves is opened to supply carrier gas including the mist to one of the closed chambers and the other opening/closing valves is closed to remove gas from the other closed chamber and separate the mist from the adsorbing agent in that closed chamber and the opening/closing valves are opened and closed alternately to separate the mist from the carrier gas.

12. The ultrasonic separating apparatus according to claim 7, wherein the adsorption collecting part has a temperature control part and the temperature control part controls the temperature of the adsorbing agent adsorbing the mist from carrier gas to below the temperature of the adsorbing agent from which the mist is being separated.

13. The ultrasonic separating apparatus according to claim 7, wherein the adsorbing agent is zeolite, activated carbon, lithium oxide, silica gel or a mixture of these.

* * * * *